United States Patent [19]

Shigeta et al.

[11] Patent Number: 4,664,988
[45] Date of Patent: May 12, 1987

[54] FUEL CELL ELECTRODE SUBSTRATE INCORPORATING SEPARATOR AS AN INTERCOOLER AND PROCESS FOR PREPARATION THEREOF

[75] Inventors: Masatomo Shigeta; Hiroyuki Fukuda; Hisatsugu Kaji, all of Iwaki; Kuniyuki Saitoh, Abiko, all of Japan

[73] Assignee: Kureha Kagaku Kogyo Kabushiki Kaisha, Tokyo, Japan

[21] Appl. No.: 718,380

[22] Filed: Apr. 1, 1985

[30] Foreign Application Priority Data

Apr. 6, 1984 [JP] Japan .................................. 59-69870
Jul. 6, 1984 [JP] Japan .................................. 59-140251

[51] Int. Cl.$^4$ ............................................. H01M 4/96
[52] U.S. Cl. ...................................... 429/44; 429/34; 429/39; 429/45
[58] Field of Search ..................... 429/26, 34, 38, 35, 429/36, 37, 39, 44, 45

[56] References Cited

U.S. PATENT DOCUMENTS

| | | | |
|---|---|---|---|
| 3,964,930 | 6/1976 | Reiser | 429/26 |
| 3,990,913 | 11/1976 | Tuschner | 429/26 |
| 4,157,327 | 6/1979 | Martin et al. | 429/26 X |
| 4,169,917 | 10/1979 | Baker et al. | 429/34 X |
| 4,233,369 | 11/1980 | Breault et al. | 429/26 |
| 4,324,844 | 4/1982 | Kothmann | 429/34 X |
| 4,345,009 | 8/1982 | Fahle et al. | 429/38 X |
| 4,489,142 | 12/1984 | Chi et al. | 429/26 |

*Primary Examiner*—Anthony Skapars
*Attorney, Agent, or Firm*—Cushman, Darby & Cushman

[57] ABSTRACT

Disclosed herein is an electrode substrate for fuel cells comprising two porous, carbonaceous layers, each having a number of elongated holes for feeding reactant gases into a fuel cell which are provided near the center of the thickness in said layer, and a gas impermeable, carbonaceous separator, interposed between said layers and having a number of elongated holes for flowing coolant which are provided near the center of the thickness in the separator. The porous layer is either a uniformly porous, carbonaceous monolayer, or has a two-layer structure comprising a more porous layer, a less porous layer and elongated holes for feeding reactant gases provided between said more porous layer and said less porous layer, the less porous layer having a bulk density larger than that of the more porous layer. There are also provided according to the invention processes for preparing such an electrode substrate for fuel cells.

13 Claims, 9 Drawing Figures

FUEL CELL ELECTRODE SUBSTRATE INCORPORATING SEPARATOR AS AN INTERCOOLER AND PROCESS FOR PREPARATION THEREOF

FIELD OF THE INVENTION This invention relates to a fuel cell electrode substrate, and more particularly, to wholly carbonaceous electrode substrate for fuel cells which have a multi-layered structure comprising a separator including therein elongated holes for coolant and porous carbonaceous layers including therein elongated holes for feeding reactant gases to a fuel cell prepared therefrom. The invention also relates to processes for preparation of such an electrode substrate, as well as to fuel cell prepared from the electrode substrates.

BACKGROUND OF THE INVENTION Bipolar fuel cells are known which have a ribbed bipolar type separator prepared from an impermeable thin plate of graphite On the other hand, ribbed electrode substrates for monopolar fuel cells have been developed which have a ribbed surface and a flat surface to be in contact with a catalyst layer. Such an electrode substrate is carbonaceous and porous as a whole.

A typical structure of a unit cell in a conventional monopolar fuel cell using such an electrode substrate is illustrated in FIG. 1. The unit cell is composed of two electrode substrates 1, two catalyst layers 2, a matrix layer 3 impregnated with an electrolyte, and two separator sheets 4 to be in contact with ribs 5 of the substrate 1. Such unit cells are stacked to make a fuel cell. Reactant gases, i.e. hydrogen as a fuel gas and oxygen or air, are fed via channels formed by the ribs 5 and the separator sheet 4 and the gases diffuse in the porous electrode substrate 1 from the ribbed surface to the flat surface to reach the catalyst layer 2 and react there.

For preparing such an electrode substrate, the following methods which have been previously proposed may be available. For example, one method for preparing general electrode substrates has been proposed in Japanese Patent Application Laying Open No. 117649/83, wherein mixtures based on short carbonaceous fibers are pressed into porous shaped articles. Another method is described in Japanese Patent Publication No. 18603/78, in which a machined paper of carbon fibers is impregnated with an organic polymer solution and made into a porous carbon fiber paper. A still another method for preparing an electrode substrate was proposed in U.S. Pat. No. 3,829,327, wherein a web of carbon fiber is subjected to chemical vapor deposition of carbon to make a porous electrode substrate. All electrode substrates prepared by these methods have a substantially homogeneous monolayer structure.

However, such homogeneous monolayer electrode substrates may exhibit some demerits such as follows: with higher bulk densities of substrates, a sufficiently high limiting current density cannot be obtained due to less diffusion of reactant gases in the substrate and premature reduction of the performance of a fuel cell prepared therefrom may occur due to an insufficient amount of electrolytes held in the substrate, in other words, the life of the fuel cell is short; on the other hand, with lower bulk densities of electrode substrates, their electric and thermal resistances will be too high and/or the mechanical strength such as bending strength will be too low.

Moreover, in an electrode substrate with ribs, the section modulus thereof is reduced due to a ribbed surface, which is not flat as seen from FIG. 1, and stress is concentrated at the sharp edges 6 of the ribs 5 resulting in insufficient mechanical strength of the whole electrode substrate. A thick substrate is, therefore, inevitably required in order to obtain a sufficiently strong shaped substrate: that is, the resistance of the substrate against diffusion of reactant gases passing through the substrate from the ribbed surface to the flat surface is increased. On the other hand, it is difficult to obtain complete flatness of the top surface of the ribs and the incomplete flatness of the ribs' top causes significantly large electric and thermal contact resistances between the ribs' top surface and a separator sheet. As generally known, such a contact resistance may be occasionally several times larger than the conductive resistance in the substrate, and therefore, a conventional monopolar electrode substrate may cause lack of uniform temperature distribution in a fuel cell and generation efficiency of a fuel cell will be low due to large contact resistance.

Generally, a fuel cell is prepared by stacking numbers of unit cells as shown in FIG. 1 and an intercooler per 5-8 unit cells 10. There is a big problem of electric and thermal contact resistances between elements, for example, between a separator and a porous layer in which reactant gases diffuse, that is, between two unit cells, or between a unit cell (a separator) and an intercooler. The contact resistances between two cells may be completely removed if an electrode substrate incorporating a separator which is integrated with porous layer(s) will be realized.

A conventional intercooler is made of carbon plates. In order to form elongated holes for feeding air or hot water into such an intercooler, two carbon plates provided with grooves on one surface thereof have been put together and sticked with one another; or alternatively, holes may have been bored in a carbon plate. However, the boring will be impossible to apply to a thin plate with a large surface of e.g. 60-80 cm in width using for in a fuel cell.

OBJECTS OF THE INVENTION

It is an object of the present invention to provide an electrode substrate for fuel cells without such demerits of conventional substrates.

Thus, a main object of the invention is to provide an electrode substrate for fuel cells which incorporates an intercooler integrated with porous layers as a whole body.

Another object of the invention is to provide processes for preparing such an electrode substrate.

These and other objects of the invention will be apparent for those skilled in the art from the following detailed description.

SUMMARY OF THE INVENTION

The electrode substrate for fuel cells provided according to the invention comprises a separator having elongated holes for coolant flow and two porous, carbonaceous layers provided on both sides of the separator and having elongated holes for feeding reactant gases into a fuel cell prepared from the electrode substrate. The separator can also serve as an intercooler. The separator and porous layers are integrated as a whole body by calcination. There are also provided processes for preparing such an electrode substrate according to the present invention.

BRIEF DESCRIPTION OF THE DRAWINGS

The invention will be fully described with reference to the attached drawings. Among the drawings.

In the drawings, the parts having the same function are indicated by the same numeral.

DESCRIPTION OF THE PREFERRED EMBODIMENTS

Figure 2:
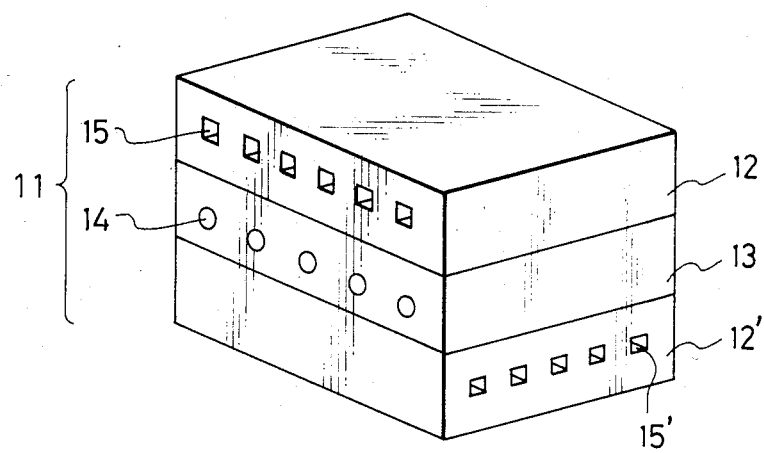
FIG. 2 illustrates the structure of an electrode substrate according to the present invention.

FIG. 2 is an explanatory view of an embodiment of the electrode substrate 11 according to the present invention. The electrode substrate 11 comprises two porous, carbonaceous layers 12, 12' and a separator 13, these three layers being integrated as a whole body by calcination.

The separator 13 is provided with a number of elongated holes 14 for flowing coolant, for example air or warm water, near the center of the thickness of the separator 13.

The elongated holes 14 for flowing coolant are continuously elongated from one side surface of the electrode substrate 11 to the other, opposite side surface thereof in the separator 13. The holes 14 are substantially parallel to each other, and to an "electrode surface" and one side surface having no openings of the holes of the separator which of course differs from the above-said side surfaces having openings of the holes.

The "electrode surface" used herein refers to the uppermost or lowermost surface of the electrode substrate shown in Figures. The "side surface" of the electrode substrate used herein refers to the side surfaces of the substrate or fuel cell, that is, those other than the said "electrode surface" as shown in Figures.

Each of the elongated holes 14 for flowing coolant may have a cross section in any form, for example, circular as shown in FIG. 2, or rectangular, square or in any other form. The cross sectional area of each elongated hole 14 may be preferably in the range of from about 3 to about 80 mm². In the holes 14 with a circular cross section as shown in FIG. 2, their diameter will be in the range of from 2 to 10 mm. If the cross section of elongated holes 14 is in any other form than circular, a diameter of a circle having the same area as their cross sectional area, said diameter being in the above-specified range, may be regarded as a "equivalent diameter" of elongated holes with any cross sectional form other than circular. Holes with smaller sizes will give too high resistance to the flow of a coolant, in cases of fuel cells with a relatively large electrode surface area wherein the lengths of the elongated holes will be longer. On the other hand, holes with larger sizes will inevitably cause increase in thickness of a separator resulting in reduction of volume efficiency of a fuel cell prepared therefrom.

Preferably, the separator 13 which may be used in the invention has an average bulk density of 1.2 g/cm³ or more, a gas permeability of $1 \times 10^{-4}$ ml/cm.hr.mmAq. or less, a thermal conductivity of 1 kcal/m.hr.° C. or more and a specific resistance of $10 \times 10^{-3}$ Ωcm or less, provided that the elongated holes are excluded from consideration.

The porous layers 12, 12' are provided with a number of elongated holes 15, 15', respectively, which form paths for feeding reactant gases into a fuel cell. These holes 15, 15' are elongated from one side surface of the electrode substrate 11 to the other, opposite side surface thereof, near the center of the thickness of the porous layer 12, 12', respectively. The elongated holes 15, 15' are substantially parallel to each other, and to an electrode surface and one side surface having no openings of the holes which of course differs from the above-said side surfaces having openings of the holes. As shown in FIG. 2, the longitudinal direction of the elongated holes 15 in the porous layer 12 on one side of the separator 13 makes approximately right angles to the longitudinal direction of the holes 15' in the porous layer 12' on the other side adjacent through the said separator 13.

Figure 4:
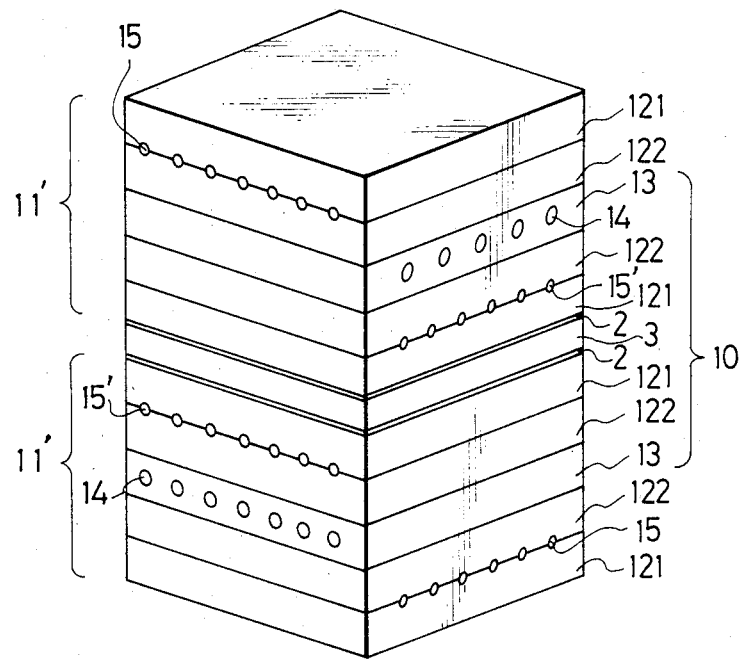
FIG. 4 is a schematic view of a partial construction of a fuel cell comprising two electrode substrates of the invention stacked with two catalyst layers and one matrix layer.
Figure 8:
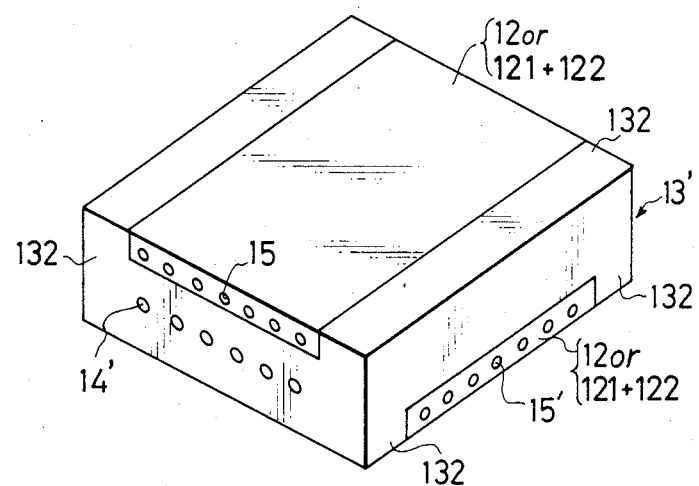
FIG. 8 illustrates the structure of the electrode substrate comprising the separator shown in FIG. 7 and two porous layers.

Each of the elongated holes 15, 15' for feeding reactant gases may have a cross section in any form, for example, rectangular as shown in FIG. 2, circular (see FIG. 4 and FIG. 8), or in any other form. The cross sectional area of each elongated hole 15, 15' is preferably in the range of from about 0.2 to 7 mm². In the holes 15 with a circular cross section as shown in FIG. 4 and FIG. 8, their diameter will be in the range of from 0.5 to 3 mm. On the other hand, when the holes 15 have any cross sectional form other than circular, a diameter of a circle having the same area as their cross sectional area, said diameter being in the above-specified range, may be regarded as a "equivalent diameter" of elongated holes with any cross sectional form other than circular. Holes with smaller sizes will give too high resistance to feed flow of reactant gases, in cases of fuel cells with a relatively large electrode surface area wherein the lengths of elongated holes will be longer. On the other hand, holes with larger sizes will inevitably cause increase in thickness of porous layers resulting in reduction of volume efficiency of a fuel cell prepared therefrom.

The porous layer 12 of the electrode substrate 11 as shown in FIG. 2 is uniformly porous and carbonaceous. Preferably, the porous layer 12 has an average bulk density in the range of from 0.4 to 0.8 g/cm³, a specific gas permeability to reactant gases of 20 ml/cm.hr.mmAq. or more and a thermal conductivity of 0.7 kcal/m.hr.° C. or more. A porous layer having an average bulk density and a gas permeability in the above-specified ranges, respectively, will have a desired mechanical strength such as bending strength and a desired gas diffusion resistance. Preferably, the porosity of the porous layer 12 may be in the range of from 50 to 80%. Pores in the porous layer 12 are open pores, and preferably, 60% or more of the pores have a diameter of 100 microns or less.

Figure 3:
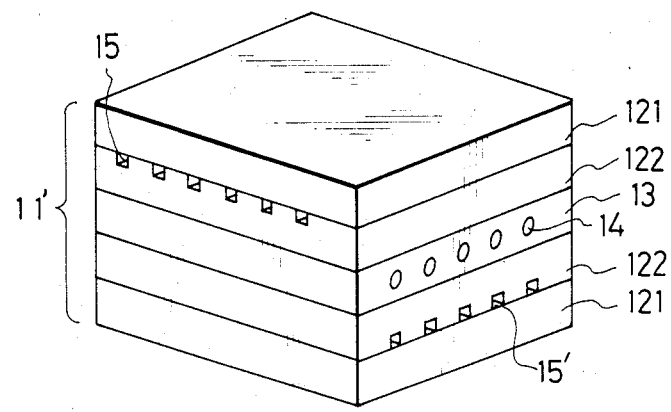
FIG. 3 illustrates the structure of another example of the electrode substrate of the invention in which the porous layer comprises two layers, each layer having a different bulk density.

In the present invention, a porous layer having a two-layered structure as shown in FIGS. 3 and 4 (121 and 122) may be used instead of the uniformly porous monolayer 12 as shown in FIG. 2, in order to further improve properties, particularly electric resistance, bending strength and the like, of a resulting electrode substrate. In such a porous layer of two-layer structure, the elongated holes 15 or 15' for feeding reactant gases are provided between two layers 121 and 122. The layer 122 adjacent to the separator 13 has a larger bulk density than the layer 121. Thus, the layer 121 having a smaller bulk density will be hereinafter referred to as a "more porous layer", and the layer 122 having a larger bulk density as a "less porous layer".

Figure 1:
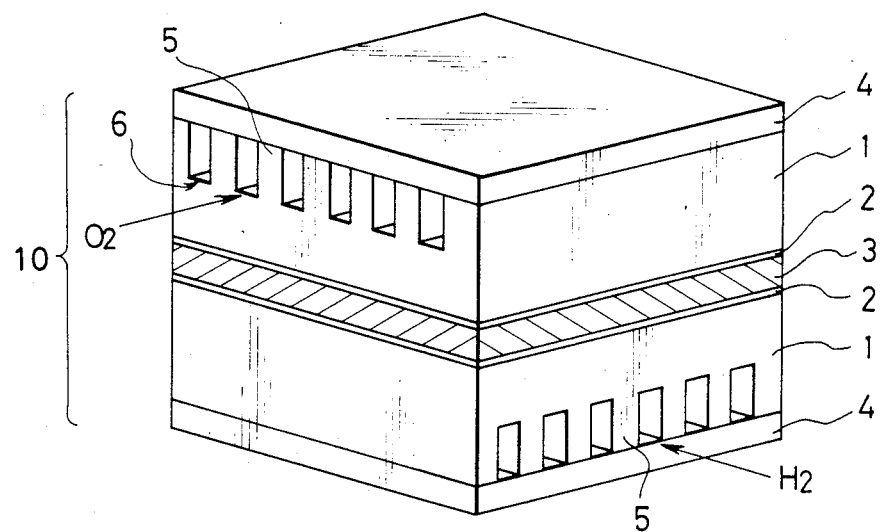
FIG. 1 illustrates a typical structure of a unit cell in a monopolar type fuel cell according to the prior art.

FIG. 3 shows the structure of an electrode substrate 11' of the invention which comprises two porous layers of the two-layer structure above described 121, 122 and a separator 13. FIG. 4 is an explanatory view of a partial construction of a fuel cell comprising two electrode substrates 11' of the invention as shown in FIG. 3, two catalyst layers 2 and one matrix layer 3, stacked with each other as shown. In FIG. 4, the unit corresponding to the unit cell of the prior art as shown in FIG. 1 is indicated by the numeral 10.

The more porous layer 121 in the electrode substrate 11' shown in FIGS. 3 and 4 has the same physical properties as those of the porous layer 12 and 12' of the electrode substrate 11 shown in FIG. 2.

Preferably, the less porous layer 122 in the electrode substrate 11' shown in FIGS. 3 and 4 has an average bulk density in the range of from 0.5 to 1.0 g/cm$^3$ and a thermal conductivity of 0.9 kcal/m.hr.° C. or more. Since the less porous layer 122 has a significantly low gas permeability to reactant gases, the reactant gases will substantially diffuse only through the more porous layer 121 and the thickness of the less porous layer 122 will be significantly reduced. Further, the mechanical strength, e.g. bending strength, of the electrode substrate 11' may be markedly improved.

The thickness of one more porous layer 121 is preferably in the range of from a fiftieth to a half of the total thickness of one more porous layer 121 plus one less porous layer 122.

The process for preparing an electrode substrate according to the present invention will hereinafter be described in detail.

In the process of the invention, a separator having elongated holes for flowing coolant may be preferably prepared separately from the porous layer.

For example, a calcined separator having elongated holes for flowing coolant may be prepared by supplying a material for separator, a material for forming elongated holes for flowing coolant, and a material for separator into a mold with a proper configuration in the above-mentioned order, press molding, postcuring and calcining.

Examples of the materials for separator are mixtures comprising 50–90% by weight of a filler, such as carbon particles having a diameter of 50 microns or less, and 50–10% by weight of a thermosetting resin binder, such as phenol resins. Carbon particles having a diameter of 50 microns or less coated with phenol resin, etc. can also be used in the invention as a filler. Carbon particles include any carbonaceous particle as well as graphite particles. Pitches and mixtures of pitch and phenol resin, as well as phenol resin alone, can be employed as a binder in the invention.

Examples of the materials for forming elongated holes for flowing coolant which may be used in the invention include textile fabrics and grating-like shaped articles of polymers, such as polyethylenes, polypropylenes, polystyrenes, polyvinyl alcohols and polyvinyl chlorides, which preferably have a carbonizing yield (at 900° C.) of 30% by weight or less. When polymers having larger carbonizing yields are used, it will be difficult to control the formation of elongated holes and their diameters or equivalent diameters. The polymers utilized for forming elongated holes do not evaporate nor melt-flow at 100° C. In other words, the polymers may be thermally deformed but should not evaporate nor melt-flow at the temperature and pressure of press molding.

Figure 5A:
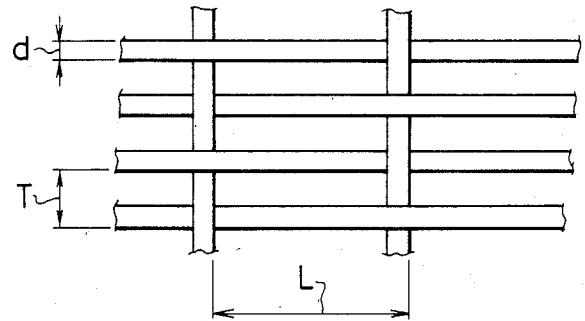
FIGS. 5a and 5b demonstrate schematically two examples of materials for forming the elongated holes used in the present invention.
Figure 5B:
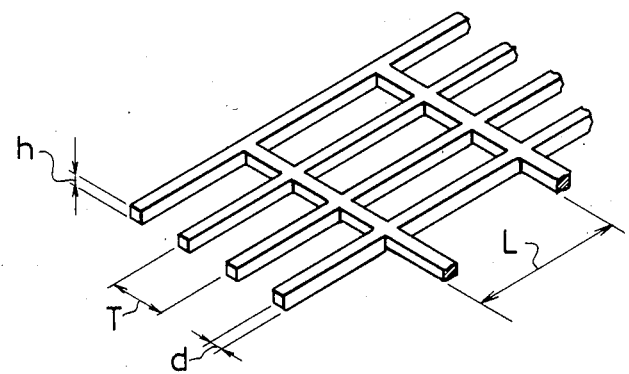

FIGS. 5a and 5b are two enlarged views illustrating schematically the materials for forming elongated holes for flowing coolant: FIG. 5a shows an example of the textile fabrics of polymer and FIG. 5b shows an example of the grating-like shaped articles of polymer.

The textile fabric of polymer shown in FIG. 5a comprises single strands or bundles of a number of single strands which are textured so that the distance (T) between two strands or bundles parallel to the coolant flow direction may be in the range of from 3 to 30 mm, and the distance (L) between two strands or bundles perpendicular to the coolant flow direction may be in the range of from 5 to 100 mm. The single strand or bundle may preferably have an approximately circular cross section with a diameter (d) in the range of from 2.2 to 11 mm.

The grating-like shaped articles of polymer as shown in FIG. 5b may be prepared, for example, by injection molding a melt of the polymer into a mold, or by press molding pellets or powder of the polymer in a mold. The cross section of a grating may be in any form, for example, circular, rectangular, square, star-like, etc. The cross sectional area of the grating may be approximately equal to the area of a circle having a diameter (equivalent diameter) in the range of from 2.2 to 11 mm. For example, in an article having gratings with a rectangular cross section as shown in FIG. 5b, a width (d) in the range of from 2 to 9 mm and a height (h) in the range of from 2.2 to 10 mm are chosen so that the cross sectional area, i.e. d×h, may be equal to that of a circle having a diameter in the range of from 2.2 to 11 mm: in other words, an equivalent diameter of the grating may be in the range of from 2.2 to 11 mm. The distance (T) between two gratings parallel to the coolant flow direction may be in the range of from 3 to 30 mm, and the distance (L) between two gratings perpendicular to the coolant flow direction may be in the range of from 5 to 100 mm.

In the course of preparation of an electrode substrate according to the invention, the textile fabrics or grating-like shaped articles of polymer may be placed on the material for separator in a mold such that elongated holes for flowing coolant may be formed near the center of the thickness of the separator. Thus, the fabrics or articles will form elongated holes in the separator by calcination after postcuring process. A major part of the materials for forming elongated holes will evaporate and dissipate by thermal decomposition, while a small amount of the materials may be carbonized by calcination.

In the present invention, the strands or bundles of the textile fabric which are parallel to the coolant flow direction will contribute to the formation of elongated holes for flowing coolant, while the strands or bundles perpendicular to the coolant flow direction are utilized to link the strands or bundles parallel to the coolant flow direction to each other so that the distance (T) is maintained in the above-specified range. The "coolant flow direction" means herein the direction of the flow of a coolant in the separator. Similarly, the gratings of the grating-like shaped article which are parallel to the coolant flow direction will mainly contribute to the formation of elongated holes for flowing coolant.

Generally, the diameter or equivalent diameter of the elongated holes will be smaller by 3–7% than the original diameter or equivalent diameter of the materials for forming elongated holes when cooled to room temperature after calcination. Thus, a diameter of the strands or bundles of the starting textile fabric, or a diameter or equivalent diameter of the gratings of the starting shaped article can be selected suitably from the above-mentioned ranges so that a preferable diameter or equivalent diameter of resulting elongated holes may be obtained, considering the above-stated contraction.

The materials for forming elongated holes for flowing coolant described above are represented only for illustration and not limitingly. Any other suitable materials can also be used for forming elongated holes for coolant flow in the invention.

After supplying the material for separator, the material for forming elongated holes for flowing coolant, and the material for separator into a mold of a proper configuration, press molding is carried out at a temperature in the range of from 120° to 160° C. and a pressure in the range of from 2 to 150 kg/cm$^2$ for a time period in the range of from 10 to 60 minutes, typically at 130° C., 80 kg/cm$^2$ for 30 minutes.

Thereafter, the shaped product is postcured at the temperature used in the press molding procedure for at least 2 hours, and then calcinated under an inert environment at a temperature in the range of 800° to 3,000° C. for about one hour. In this procedure, the temperature may preferably be increased slowly, e.g. in a rate of 100°±50° C. per hour, up to about 700° C., so that any stress may not be generated, which is due to sudden shrinkage in the thermal decomposition at low temperatures. Such stress would cause exfoliation of layers and/or cracks.

Instead of the calcined separator prepared in the above-described process, a shaped separator as press molded can also be used in the later procedures described below without having been subjected to the calcination procedure above to prepare an electrode substrate in the invention.

An electrode substrate as shown in FIG. 2 having a uniform porous monolayer 12, 12' may be prepared in the following manner using the calcined separator or shaped separator as molded.

Accordingly, a material for porous layer, a material for forming elongated holes for feeding reactant gases, and a material for porous layer are supplied into a mold with a proper configuration in this order, a calcined separator or shaped separator as molded is placed, then again a material for porous layer, a material for forming elongated holes for feeding reactant gases, and a material for porous layer are supplied in this order, and these materials are then press molded, postcured and calcined as a whole body.

Examples of the materials for porous layer which may be used in the invention are mixtures comprising 10–50% by weight of a filler, such as short carbon fibers, carbon particles and the like, 20–40% by weight of a binder, such as phenol resins, epoxy resins, petroleum and/or coal pitches and mixtures thereof, and 20–50% by weight of a pore regulator, such as polyvinyl alcohols, polystyrenes, polyethylenes, polypropylenes, polyvinyl chlorides and mixtures thereof.

Preferably, the short carbon fibers employed as a filler in the invention have a diameter in the range of from 5 to 30 microns and a fiber length in the range of from 0.02 to 2 mm. With carbon fibers having a length of more than 2 mm, the fibers tangle with one another to form a wool-pill in the course of the present process up until press molding and, as a result, a desired porosity and a desired sharp distribution of pore diameters are not obtained. The required strength of the product is not obtained with carbon fibers having a length of less than 0.02 mm. The linear carbonizing shrinkage of the carbon fibers is in the range of not more than 3% when the fibers are calcined at 2,000° C. Larger shrinkages may cause cracks in the product on calcination. Such carbon fibers having a preferred shrinkage will enable production of a larger electrode substrate.

The binder employed in the invention may be useful for combining the carbon fibers with each other as a carbonaceous binder after carbonizing and, in order to obtain a desired bulk density, is a resin having a carbonizing yield in the range of from 30 to 75% by weight. Such resins include phenol resins, epoxy resins, petroleum and/or coal pitches and mixtures thereof. Powdery phenol resin or a combination thereof with powdery pitch is most preferred in dry blending and it has been found that there can be prepared with such a binder an electrode substrate having excellent properties.

The amount of a binder mixed is in the range of from 10 to 50% by weight, preferably from 20 to 40% by weight. With less than 10% by weight of a binder, the mechanical strength of a resulting substrate will be low due to an insufficient amount of a binder. On the other hand, desired pore diameter and gas permeability are not obtained with more than 50% by weight of a binder.

The pore regulator is an important material for determining pore diameter of a final product. In the invention, organic granules, 70% or more of which have a particle diameter in the range of from 30 to 300 microns, may preferably be employed in order to regulate the bulk density and pore diameters of the product. Such organic granules do not evaporate nor melt-flow at 100° C. In other words, the organic granules may be thermally deformed but should not evaporate nor melt-flow at the temperature and pressure of press molding.

The pore regulator may preferably be selected from polyvinyl alcohols, polyvinyl chlorides, polyethylenes, polypropylenes, polystyrenes and mixtures thereof which have a carbonizing yield of 30% by weight or less. With a carbonizing yield of more than 30% by weight it will be difficult to control the porosity and/or pore diameter.

The amount of a pore regulator may be suitably selected from the range of from 20 to 50% by weight depending on the desired bulk density and pore diameters of an electrode substrate.

Preferably, the amounts to be mixed of the filler (A), the binder (B) and the pore regulator (C) will satisfy the following equation:

$$(A+C)/B = 1.5 \text{ to } 4.0$$

wherein the amounts are based on the weight. Without this range it is difficult to satisfy all the desired properties, such as bulk density, bending strength, gas permeability and electric resistance. When 10–50% by weight of the filler and 20–50% by weight of the pore regulator are used in the invention, the amount of the binder will preferably be in the range of from 20 to 40% by weight.

The materials for forming elongated holes for feeding reactant gases into a fuel cell may be substantially same as the materials for forming elongated holes for flowing coolant described previously.

Textile fabrics of polymer as shown in FIG. 5a which can be used in order to obtain the diameters or equivalent diameters of the elongated holes for feeding reactant gases in the desired range described previously comprises single strands or bundles of a number of single strands which are textured so that the distance (T) between two strands or bundles parallel to the gas flow direction may be in the range of from 1.5 to 5 mm and the distance (L) between two strands or bundles perpendicular to the gas flow direction may be in the range of from 5 to 50 mm. The single strand or bundle may preferably have an approximately circular cross section with a diameter (d) in the range of from 0.5 to 3.3 mm.

The grating-like shaped articles of polymer as shown in FIG. 5b which can also be employed in the invention may be prepared, for example, by extrusion molding a melt of the polymer in a mold, or by press molding pellets or powder of the polymer in a mold. The cross section of a grating may be in any form, for example, circular, rectangular, square, star-like, etc. The cross sectional area of the grating may be approximately equal to the area of a circle having a diameter (equivalent diameter) in the range of from 0.5 to 3.3 mm. For example, in an article having gratings with a rectangular cross section as shown in FIG. 5b, a width (d) in the range of from 0.45 to 2.7 mm and a height (h) in the range of from 0.5 to 3.3 mm are chosen so that the cross sectional area, i.e. d×h, may be equal to that of a circle having a diameter in the range of from 0.5 to 3.3 mm: in other words, an equivalent diameter of the grating may be in the range of from 0.5 to 3.3 mm. The distance (T) between two gratings parallel to the gas flow direction may be in the range of from 1.5 to 5 mm, and the distance (L) between two gratings perpendicular to the gas flow direction may be in the range of from 5 to 50 mm.

In the course of preparation of an electrode substrate of the invention, the textile fabrics or grating-like shaped articles of polymer may be placed on the material for porous layer in a mold, so that elongated holes may be formed near the center of the thickness of the porous layer. Thus, the fabrics or articles will form elongated holes for feeding reactant gases in the porous layer by calcination after postcuring process. A major part of the materials for forming elongated holes will evaporate and dissipate by thermal decomposition while a small amount of the materials may be carbonized by calcination.

In the present invention, the strands or bundles of the textile fabric which are parallel to the gas flow direction will contribute to the formation of elongated holes while the strands or bundles perpendicular to the gas flow direction are utilized to link the strands or bundles parallel to the gas flow direction to each other so that the distance (T) is maintained in the above-specified range. The "gas flow direction" means herein the direction of the flow of reactant gases to be fed into the elongated holes of an electrode substrate. Similarly, the gratings of the grating-like shaped article which are parallel to the gas flow direction will mainly contribute to the formation of elongated holes.

The press molding conditions to obtain an electrode substrate of the invention are a molding temperature in the range of from 70° to 170° C., a molding pressure in the range of from 5 to 100 kg/cm² and a time period in the range of from 10 to 60 minutes.

The press molded product is thereafter postcured at the temperature used in the press molding procedure for at least 2 hours, and then calcinated under an inert environment at a temperature in the range of from 800° to 3,000° C. for about one hour. In this procedure, the temperature may preferably be increased slowly, e.g. in a rate of 100°±50° C. per hour, up to about 700° C., so that any stress may not be generated, which is due to sudden shrinkage in the thermal decomposition at low temperatures. Such stress would cause exfoliation of layers and/or cracks.

An electrode substrate comprising another porous layer of a two-layer structure as shown in FIGS. 3 and 4 may be prepared in the process of the invention described below. The porous layer can be prepared either by press molding simultaneously with the separator as a whole body or by pre-press molding separately from the separator followed by calcining together with the separator as a whole body.

In one process of the invention, a material for a more porous layer, a material for forming elongated holes for feeding reactant gases, and a material for a less porous layer are supplied into a mold with a proper configuration in this order, the calcined separator or shaped separator as molded is placed, then again a material for a less porous layer, a material for forming elongated holes for feeding reactant gases, and a material for a more porous layer are supplied in this order, and then, these implied materials are press molded, postcured and calcined as a whole body.

The materials used except the material for a less porous layer are substantially the same as described previously. For example, the material for a more porous layer is the same as those for the porous layers described previously.

The materials for a less porous layer are similar to those for porous layers described above. For example, there can be used mixtures comprising 30–70% by weight of a filler, 20–40% by weight of a binder and 10–30% by weight of a pore regulator, examples of each material being exemplified previously. Typical examples of such mixtures are those prepared by blending, in a mixer such as Henschel mixer, 40–60% by weight of short carbon fibers having an average fiber length of 1 mm or less, 10–30% by weight of polyvinyl alcohol particles having diameters distributed in the range of from 100 to 300 microns, and 25–35% by weight of powdery phenol resin having a particle diameter of 100 microns or less. In such a mixture, the average fiber length of the short carbon fibers is shorter by 0.1–0.3 mm than that of the carbon fibers used in the mixtures for porous layers, and the amount of the polyvinyl alcohol particles is smaller by 5–20% by weight than that in the mixtures for porous layers.

In another process of the present invention, into a mold of a proper configuration, a material for a less porous layer, a material for forming elongated holes for feeding reactant gases and a material for a more porous layer are supplied in this order, these materials are pre-press molded at a temperature in the range of from 60° to 100° C. and a pressure in the range of from 20 to 50 kg/cm² for a time period in the range of from 10 to 30 minutes, typically at 80° C., 30 kg/cm² for 20 minutes. On the other hand, the same procedures are again repeated to prepare another pre-press molded porous product. One of the pre-press molded porous products is placed in a mold of a proper configuration with the more porous layer being on the lower side, the calcined separator or shaped separator by molding is then placed on the pre-press molded porous product. the other pre-press molded porous product is placed on the separator material with the less porous layer being faced to the separator material, and these implied materials are then press molded at a temperature in the range of from 130° to 160° C. and a pressure in the range of from 20 to 50 kg/cm² for a time period in the range of from 10 to 30 minutes, typically at 140° C., 40 kg/cm² for 20 minutes, postcured and calcined. Procedures and materials in this process are substantially same as above-described substrate having single porous layer.

The electrode substrate of the present invention exhibits an improved mechanical strength, for example, such as bending strength. There are attained further advantages according to the invention: that is, a thinner substrate may be prepared, resulting in a shorter diffusion path or a lower resistance to diffusion of reactant gases and a larger current density. On the other hand, no conventional intercoolers are required for stacking unit cells to make a fuel cell since an intercooler itself is incorporated in the separator of the electrode substrate in the invention. This fact will result in a lower cost for preparing a fuel cell using the electrode substrates according to the present invention, as compared with conventional fuel cell requiring additional intercoolers. In addition, there is no electric nor thermal contact resistance between unit cell and intercooler. As a result, total electric and thermal resistances of a fuel cell prepared using the substrates of the invention are markedly reduced.

Further, an electrode substrate comprising two porous layers and a separator without any intercooler can also be prepared according to the process of the invention, if any material for elongated holes for flowing coolant is not used in the process for preparing a separator incorporating an intercooler in the invention. The procedures of this process may be apparent for those skilled in the art. By using resulting substrates incorporating a separator without intercooler together with the electrode substrate of the invention which has an intercooler therein, there can be obtained a fuel cell in which no electric nor thermal contact resistances between separators (such as separator without intercooler and separator incorporating an intercooler) and electrode substrates.

The advantages of the invention will be more fully illustrated in Table 1 which shows the physical properties of electrode substrates of the invention and the prior art (FIG. 1) for comparison.

TABLE 1

| | | prior art | present invention |
|---|---|---|---|
| bending strength (kg/cm²) | | 100 | 250 |
| compressive strength (kg/cm²) | | 100 | 110 |
| electric [1] | substrate | 8 | 15 |
| resistance | contact resistance[2] | 30 | — |
| (mΩ) | total of a cell | 77[3] | 15 |

TABLE 1-continued

| | prior art | present invention |
|---|---|---|
| thickness for gas diffusion (mm) | 1.2 | 0.5 |

Note:
[1] resistance per 1 cm²
[2] resistance measured at contact pressure of 1 kg/cm²
[3] separator sheet (1 mΩ) + two substrates + two contact resistances The electrode substrates of the present invention are suitably utilized for making a fuel cell by stacking them as shown in FIG. 1. On operation of such a fuel cell, however, the reactant gases may also diffuse out from the side surfaces having no openings of the elongated holes of the porous layers of the electrode substrate in the fuel cell, which may cause dangers of mixing of the gases by the side surfaces.

Figure 6:
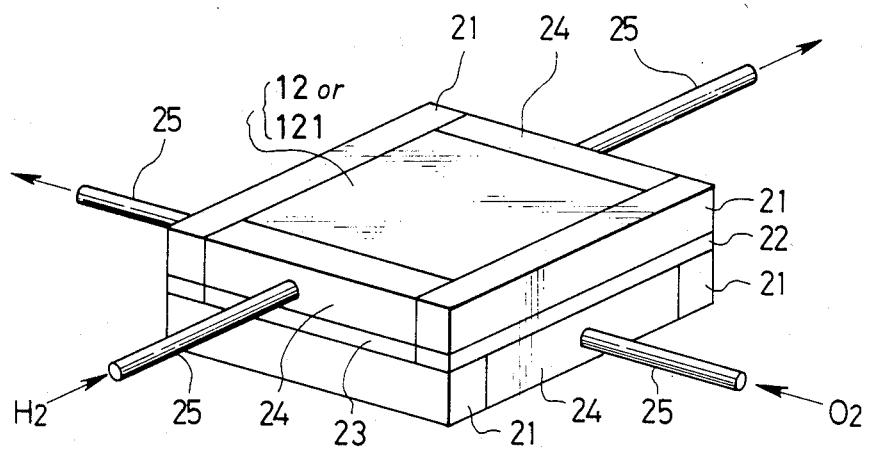
FIG. 6 demonstrates schematically a partial construction of a fuel cell as practically used in operation.

In order to prevent such dangers, the electrode substrates are generally impregnated with a fluorocarbon resin in the peripheral regions thereof, or alternatively provided with a number of peripheral members, for example, as shown in FIG. 6. In FIG. 6, peripheral sealing members 21, 22, 23 are made of a material having a good insulation to gas diffusion, a thermal resistance at about 200° C. on operation of a fuel cell and a good resistance to corrosion of 100% phosphoric acid, for example, Teflon ® (trade mark of Du Pont Corp., U.S.A.), silicon carbide, ceramics, or a suitable material coated with Teflon ® or silicon carbide. Further, gas manifolds 24 are provided with a tube 25 for introducing reactant gases into the elongated holes for feeding the gases to the porous layer 12 or 121.

Recently, there has been a developed separator integrated with such peripheral members for sealing the reactant gas diffusion from the side surfaces of a fuel cell.

Figure 7:
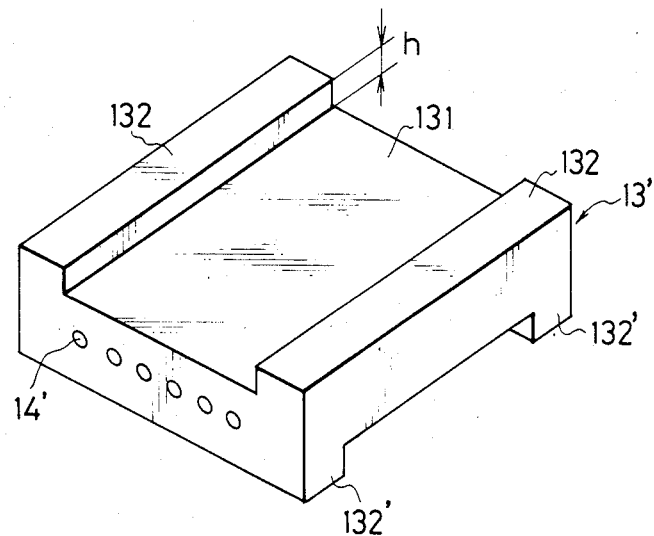
FIG. 7 illustrates another example of the separator which may be used in the invention.

One preferred example of such separators having peripheral members which may preferably be used in the present invention is illustrated in FIG. 7, wherein a separator 13' comprises a gas impermeable separator plate 131 and peripheral sealing members 132, 132', the plate and members being integrated as a whole body by calcination. In the separator plate 131, there are a number of elongated holes 14' for flowing coolant near the center of the thickness thereof.

As shown in FIG. 7, a pair of peripheral sealing members 132 or 132' are provided on each side of the separator plate 131, and the longitudinal direction of the members 132 is perpendicular to the longitudinal direction of those 132'.

Preferably, the cross section of the elongated holes 14' is a circle having a diameter in the range of from 2 to 10 mm.

The separator 13' excluding the elongated holes 14' has a gas permeability in the direction of the thickness of $10^{-4}$ cm²/hr.mmAq. or lower, a bending strength of 500 kg/cm² or higher, a thermal conductivity of 4 kcal/m.hr.°C. or higher, and an electric resistance of 10 mΩ.cm or lower. Thus, the separator 13' is excellent in gastightness, mechanical strength and thermal and electrical conductivities.

The height (h) of the peripheral sealing member 132, 132' corresponds to a thickness of a porous layer for reactant gases to diffuse therein, for example, the porous layer 12 shown in FIG. 2 or the porous two layer 121 plus 122 shown in FIG. 3 and FIG. 4, and the generally 2.5 mm or smaller. The permeability of the sealing member 132, 132' is sufficiently low, generally $10^{-2}$ cm²/hr.mmAq. or lower, to prevent the reactant gas diffusion through the member to the outside.

Such a separator may be prepared in the following manner.

In one preferred process, after a shaped product for a separator plate and four shaped plates for peripheral sealing members are separately prepared by pre-pressing, these plates are press molded in a mold with a proper configuration and calcined at a temperature of 1,000° C. or higher.

The shaped product for a separator plate can be prepared by supplying, into a mold having a proper configuration, a mixed material for separator, a material for forming elongated holes for flowing coolant, and a mixed material for separator, in this order, followed by pre-pressing.

The mixed material for separator may comprise 50-90% by weight, preferably 60-80% by weight, of a carbonaceous filler and 10-50% by weight, preferably 20-40% by weight, of a binder.

The carbonaceous filler which may be preferably used is selected from non-graphitizable carbonaceous particles, such as calcined pieces of oxydized pitch, carbon fiber pieces, calcined phenol particles and the like. The carbonaceous particles have an average diameter of 40 microns or less, preferably 10 microns or less. The preferred materials for the filler are those obtained by calcinating and breaking into pieces oxidized pitches prepared by the methods described in, e.g. Japanese Patent Publication No. 31116/78. Any mixtures of the aforementioned particles can be also employed.

The binder is preferably a phenol resin.

The materials for forming elongated holes for flowing coolant which may be preferably used in the preparation of the separator are those described herein previously which have a carbonizing yield of 30% by weight or less, for example, grating-like shaped articles of polymer as shown in FIG. 5b having gratings of 2.2-11.0 mm in diameter, T=3 to 30 mm, L=5 to 100 mm.

The linear shrinkage of the materials for forming elongated holes have been found to be preferably in the range of from 5 to 7%, as a whole body of electrode substrate, on calcination. Thus, a diameter of the gratings of the materials for forming elongated holes can be suitably selected from the above-mentioned range so that a preferable diameter of the resulting elongated holes may be obtained, considering the contraction.

The pre-pressing conditions are a molding temperature in the range of from 70° to 170° C., preferably from 100° to 120° C., a molding pressure in the range of from 2 to 150 kg/cm², preferably from 80 to 150 kg/cm², and a time period for molding in the range of from 10 to 60 minutes, preferably from 5 to 30 minutes.

The shaped plates for peripheral sealing members can be prepared in a similar manner by supplying the mixed material for separator into a mold with a proper configuration followed by pre-pressing under the above conditions.

The shaped product for a separator plate and four shaped plates for peripheral sealing members thus pre-pressed are then press molded in a mold having a proper configuration (see FIG. 7). The press molding is carried out at a temperature in the range of from 120° to 170° C., preferably from 130° to 160° C., and a pressure in the range of from 2 to 150 kg/cm², preferably from 80 to 150 kg/cm², for a time period in the range of from 10 to 20 minutes.

After press molding, the molded product can be post-cured at a temperature in the range of from 130° to 160° C. and a pressure of 0.5 kg/cm² or lower for at least 2 hours.

The thus obtained product is then calcined at a temperature of 1,000° C. or higher.

In another process, the separators can be prepared by supplying, into a mold with a proper configuration so as to obtain a desired shape as shown in FIG. 7, a mixed material for separator, a material for forming elongated holes for flowing coolant, and a mixed material for separator, in this order, press molding, optionally but preferably postcuring, and calcinating at 1,000° C. or higher.

Such a separator integrated with peripheral sealing members and incorporating an intercooler can be used to make a fuel cell electrode substrate as shown in FIG. 8, wherein a porous layer may be any porous layer, for example, any one of those prepared by methods described in Japanese Patent Application Laying Open Nos. 117649/83, 37662/84, 46763/84, 63664/84 and 66063/84.

The electrode substrates as shown in FIG. 8 may be prepared in almost the same manner as described herein.

As integrated in a whole body, the thermal and electric resistances in the peripheral regions of the substrates as shown in FIG. 8 may be significantly improved or reduced, while at the same time no conventional peripheral member for sealing is required therein.

EXAMPLES

The present invention will be illustrated while referring to the following non-limiting examples. It should be understood that various modifications and variations may be made by those skilled in the art without undue experimentation and such modifications and variations will be included in the scope of the present invention.

In these examples, the "porosity P(%)" was determined by the following equation while assuming that the real density of a carbonaceous substrate was 1.6 g/cm³:

$$P = (1 - \rho_b / 1.6) \times 100$$

wherein $\rho_b$ is a measured bulk density (g/cm³) of a specimen; the "bending strength (kg/cm²)" of a carbonaceous shaped article was determined according to Japanese Industrial Standards (JIS) K-6911/1970 while using a specimen with a dimension of 100×10×2.5 mm; and the "average pore diameter (μm)" of a specimen was measured by a mercury porosimeter (manufactured by Carlo Erba Strumentazione, Italia). The "specific gas permeability $Q_s$ (ml/cm.hr.mmAq.)" was determined in the following manner: a cylindrical specimen of 90 mm in diameter and t mm in thickness was cut out from a shaped article to be measured, the circumferential side surface of the specimen was coated with a thermosetting resin so that gas should not diffuse out therethrough, both longitudinal end surfaces of the specimen were then put between two cylindrical gas tubes with flange holding a gasket, a predetermined amount (10 l/min) of air was supplied from one end of the specimen to the other end thereof which was open to the atmosphere, the pressure loss between two ends of the specimen was measured by a manometer attached to the upstream of the gas tube and the specific gas permeability $Q_s$ was then calculated by the following equation:

$$Q_s = \frac{6 \times t \times 10^4}{50.24 \times \Delta p}$$

wherein $\Delta p$ is a measured pressure loss (mmAq.) and 50.24 cm² is the real area to be measured (a circle of 80 mm in diameter). Further, the "volume resistivity $\rho_v (\Omega cm)$" was determined in the following manner: both ends of a specimen were coated with an electroconductive material and an electrical resistance between two ends of the specimen was measured according to SRIS (Standards of Japan Rubber Association) 2301-1969, and then the volume resistivity was calculated by the following equation:

$$\rho_v = R \cdot w \cdot t / l$$

wherein R is a measured resistance ($\Omega$) between two ends of the specimen, l (cm) is a longitudinal length (in the direction to be measured), and w (cm) and t (cm) are a horizontal and a vertical lengths, respectively, defining a cross section of the specimen.

EXAMPLE 1

Preparation of Grating-like Shaped Articles of Polypropylene

Pellets of polypropylene, J-215 by TONEN SEKIYUKAGAKU K.K., Japan, were melt extruded through a screw-injection molding machine at 230° C., 500 kg/cm² into a stainless steel mold having a proper configuration held at about 50° C.

There were prepared grating-like shaped articles of polypropylene as shown in FIG. 5b but they had gratings with a square cross section of 0.85 mm on a side, T=2.5 mm, L=40 mm.

These articles were used as materials for forming elongated holes for feeding reactant gases in the following examples.

Similar procedures were repeated to prepare grating-like shaped articles of polypropylene for forming elongated holes for flowing coolant which have gratings with a circular cross section of 7.4 mm in diameter, T=10 mm, L=80 mm.

EXAMPLE 2

Preparation of Separators

Into a mold having a proper configuration, there were supplied a homogeneous mixture comprising 70% by weight of carbon particles, NIHON KOKUEN SHOJI Co., Japan, 40 microns in average diameter, and 30% by weight of phenol resin, Asahi Yukizai Co. Ltd., Japan, the grating-like shaped article of polypropylene for forming elongated holes for flowing coolant, prepared in Example 1, and then the homogeneous mixture, same as above.

These materials were press molded at 130° C., 80 kg/cm² for 30 minutes. The shaped separator by molding was used for the material of a separator (Molded separator material) in Examples 4 and 5 below.

The shaped separator was then postcured at 140° C. for about 2 hours and calcined under nitrogen environment at 2,000° C. for one hour. The thus obtained calcined separator was used in the following Example 3.

EXAMPLE 3

Preparation of Three Layer Electrode Substrate

Into a mold with a proper configuration, there was supplied a mixture for porous layer comprising 40% by weight of short carbon fibers, M-104S by Kureha Kagaku Kogyo Co., Ltd., 0.45 mm in average fiber length, 30% by weight of fine particles of polyvinyl alcohol as a pore regulator, The Nippon Gosei Kagaku Kogyo Co., Ltd., Japan, and 30% by weight of phenol resin, Asahi Yukizai Co. Ltd., Japan.

On the mixture, there were supplied the grating-like shaped article of polypropylene for forming elongated holes for feeding reactant gases, prepared in Example 1, and then the mixture for porous layer, same as above. There were further supplied on the materials the calcined separator, prepared in Example 2, the mixture for porous layer, same as above, the material for forming elongated holes for feeding reactant gases, same as above, and finally the mixture for porous layer, same as above, in this order.

These materials were press molded at 130° C., 40 kg/cm² for 20 minutes, postcured at 150° C. for about 2 hours, and, after heating slowly by 100° C. per hour up to 700° C., calcined under nitrogen at 2,000° C. for one hour.

There was obtained an electrode substrate having a three layer structure as shown in FIG. 2, and elongated holes for feeding reactant gases and those for flowing coolant had circular cross sections of about 0.8 mm and about 7 mm in diameter, respectively. The physical properties of the substrate are shown in Table 2.

TABLE 2

|  | separator | porous layer |
|---|---|---|
| thickness (mm) | 9 | 3.0 |
|  |  | (total of two) |
| bulk density (g/cm³)[1] | 1.45 | 0.58 |
| porosity (%)[1] | — | 64 |
| specific gas permeability (ml/cm. hr. mm Aq.) | $1.8 \times 10^{-5}$ | 110 |
| average pore diameter ($\mu$)[1] | — | 38 |
| bending strength (kg/cm²) | 650 | 105 |
| volume resistivity ($\Omega$cm) | $5.4 \times 10^{-3}$ | $18 \times 10^{-3}$ |
| thermal conductivity (kcal/m. hr. °C.) | 4.5 | 0.9 |

Note:
[1] exclusive of holes

EXAMPLE 4

Preparation of Five Layer Electrode Substrate

Into a mold with a proper configuration, there was supplied a mixture for a more porous layer comprising 40% by weight of short carbon fibers, M-104S by Kureha Kagaku Kogyo Co., Ltd., 0.45 mm in average fiber length, 30% by weight of fine particles of polyvinyl alcohol as a pore regulator, The Nippon Gosei Kagaku Kogyo Co., Ltd., Japan, and 30% by weight of phenol resin as a binder, Asahi Yukizai Co. Ltd., Japan.

On the mixture, there were supplied the grating-like shaped article of polypropylene for forming elongated holes for feeding reactant gases, prepared in Example 1, and then a mixture for a less porous layer comprising 50% by weight of short carbon fibers, same as above, 20% by weight of polyvinyl alcohol, same as above, and 30% by weight of phenol resin, same as above.

There were further supplied on the materials the molded separator material, prepared in Example 2, the mixture for a less porous layer, same as above, the material for forming elongated holes for feeding reactant gases, same as above, and finally the mixture for a more porous layer, same as above, in this order.

These materials were then pressed at 130° C., 40 kg/cm² for 20 minutes. After postcuring at 150° C. for about 2 hours, the temperature of the pressed product was slowly increased by 100° C. per hour up to 700° C., and then the product was calcined under nitrogen gas atmosphere at 2,000° C. for one hour.

There was obtained an electrode substrate having a five layer structure as shown in FIG. 3, and elongated holes for feeding reactant gases had a square cross section of about 0.8 mm on a side and elongated holes for flowing coolant had a circular cross-section of about 7 mm in diameter. The physical properties of the substrate are shown in Table 3.

TABLE 3

|  | less porous layer | more porous layer | separator |
| --- | --- | --- | --- |
| thickness (mm) | 1.0 | 0.5 | 9 |
| bulk density (g/cm³)[1] | 0.72 | 0.51 | 1.45 |
| porosity (%)[1] | 55 | 68 | — |
| specific gas permeability (ml/cm. hr. mm Aq.) | — | 110 | $1.8 \times 10^{-5}$ |
| average pore diameter[1] (microns) | 42 | 39 | — |
| bending strength (kg/cm²) |  | 135 | 650 |
| volume resistivity (Ωcm) |  | $17 \times 10^{-3}$ | $5.4 \times 10^{-3}$ |
| thermal conductivity (kcal/m. hr. °C.) |  | 0.9 | 4.5 |

Note:
[1]exclusive of holes

EXAMPLE 5

The mixture for a less porous layer of Example 4, the grating-like shaped article for forming elongated holes for reactant gases prepared in Example 1, and the mixture for a more porous layer of Example 4 were supplied into a mold with a proper configuration, pressed at 80° C., 30 kg/cm² for 20 minutes, and removed out of the mold. The same procedures were repeated to prepare another pre-press molded porous product.

One of the pre-pressed products was placed in a mold having a proper configuration with the more porous layer being on lower side. Then, the molded separator material prepared in Example 2 without calcination, was placed on the less porous layer of the pre-pressed product, and the another pre-pressed porous layer being faced onto the separator material in the mold.

These materials were press molded at 130° C., 40 kg/cm² for 20 minutes, and postcured at 140° C. for about 2 hours. The temperature of the molded product was increased slowly in a rate of 100° C. per hour up to 700° C. Thereafter, the product was calcined at 2,000° C. for one hour under nitrogen environment.

There was obtained an electrode substrate which had the structure and properties similar to that of Example 4.

EXAMPLE 6

Preparation of Grating-like Shaped Articles for Forming Elongated Holes for Flowing Coolant The same procedure of Example 1 was repeated. There was obtained a grating-like shaped article of polypropylene as shown in FIG. 5b but they had gratings with circular cross section of 3.5 mm in diameter, T=10 mm, L=100 mm.

EXAMPLE 7

Preparation of Separators with Peripheral Sealing Members

Oxydized pitches with an average particle diameter of 10 microns or less, which had been prepared according to the method described in Japanese Patent Publication No. 31116/78, were calcined at 800° C. and broken into pieces having an average particle diameter of 10 microns or less.

A mixture for separator was prepared by blending 65% by weight of the calcinated pieces of oxidized pitch and 35% by weight of phenol resin, RM-210 by Asahi Yukizai Co. Ltd., Japan, in a vane mixer.

Into a mold of a proper configuration, there were supplied the mixture and the material for forming elongated holes for flowing coolant prepared in Example 6. These materials were pressed at 110° C., 100 kg/cm² to prepare a separator plate having elongated holes.

In another mold of a proper configuration, the mixture described above was fed and pressed at 110° C., 100 kg/cm². Thus, a shaped plate for peripheral sealing members was prepared, which was cut into smaller plates for each peripheral member with a desired size.

The separator plate and four peripheral member plates prepared above were placed in a mold with a proper configuration so that a desired structure as shown in FIG. 7 would be obtained, pressed at 140° C., 50 kg/cm², postcured at about 150° C., 0.4 kg/cm², and calcined at 1,500° C.

The properties of the resulting separator having peripheral sealing members integrated with the separator plate were as follows:

specific gas permeability at $N_2$ of 0.2 kg/cm² G: $4.8 \times 10^{-7}$ cm²/hr.mmAq. (excluding the holes);
electric resistance: 7.6 mΩ.cm;
thermal conductivity: 4.7 kcal/m.hr.°C.;
bending strength: 860 kg/cm²;
diameter of elongated hole: 3.1 mm;
height of peripheral member: 2.0 mm;
gas permeability towards side surface at $N_2$ of 0.2 kg/cm² G: $1.4 \times 10^{-3}$ cm²/hr.mmAq.

What is claimed is:

1. An electrode substrate for fuel cells comprising: (1) two porous carbonaceous layers, each having a number of elongated holes for feeding reactant gases into a fuel cell, which holes are defined near the center of the thickness thereof, and (2) a gas impermeable, carbonaceous separator interposed between said layers, having a number of elongated holes for flowing coolant, which holes are defined near the center of the thickness thereof; said two porous layers and said separator being integrated as a whole body by calcination, said separator excluding the elongated holes for flowing coolant having an average bulk density of about 1.2 g/cm³ or more, a gas permeability of about $1 \times 10^{-4}$ cm²/hr.mmAq. or less, a thermal conductivity of about 1 kcal/m.hr.°C. or more and a specific resistance of about $10 \times 10^{-3}$ Ωcm or less; each said porous layer being a uniform monolayer and having an average bulk density in the range of about 0.4 to 0.8 g/cm³, a porosity in the range of about 50 to 80%, a gas permeability of about 20 ml/cm.hr. mmAq. or more and a thermal conductivity of about 0.7 kcal/m.hr.°C. or more, about 60% or more of the open pores of said porous layer having a diameter of about 100 microns or less.

2. The electrode substrate of claim 1, wherein said elongated holes for flowing coolant are parallel to each other, to an end face of the electrode, and to a side surface of the electrode, are continuously elongated in said separator from one side surface of the electrode to another side surface opposite thereto, and have the cross-sectional area as a circle having a diameter of about 2 to 10 mm.

3. The electrode substrate of claim 1, wherein said elongated holes for feeding reactant gases are parallel to each other, to an end face of the electrode, and to a side surface of the electrode, are continuously elongated in said porous layer from one side surface of the electrode to another side surface opposite thereto, and have the same cross-sectional area as a circle having a diameter of about 0.5 to 3 mm; said elongated holes in said porous layer on one side of said separator and those in said porous layer on the other side of said separator being disposed perpendicular to each other.

4. The electrode substrate of claim 1, wherein said calcination is carried out under an inert environment at a temperature in the range of about 800° to 3,000° C.

5. An electrode substrate for fuel cells comprising (1) two porous carbonaceous layers and (2) a gas impermeable, carbonaceous separator interposed between said layers, having a number of elongated holes for flowing coolant, which holes are defined near the center of the thickness of said separator; said two porous layers and said separator being integrated as a whole body by calcination; said separator excluding said elongated holes for flowing coolant having an average bulk density of about 1.2 g/cm$^3$ or more, a gas permeability of about $1 \times 10^{-4}$ cm$^2$/hr.mmAq. or less, a thermal conductivity of about 1 kcal/m.hr.°C. or more and a specific resistance of about $10 \times 10^{-3}$ Ωcm or less; each of said porous layers having a two layer structure, said two layer structure comprising a first porous layer and a second porous layer and elongated holes for feeding reactant gases defined between said first porous layer and said second porous layer, said second porous layer having a bulk density larger than that of said first porous layer and being adjacent to said separator; said first porous layer having an average bulk density of about 0.4 to 0.8 g/cm$^3$, a porosity of about 50 to 80%, a gas permeability of about 20 ml/cm.hr.mmAq. or more and a thermal conductivity of about 0.7 kcal/m.hr.°C. or more, about 60% or more of the open pores of said first porous layer having a diameter of about 100 microns or less, and said second porous layer having an average bulk density of about 0.5 to 1.0 g/cm$^3$ and a thermal conductivity of about 0.9 kcal/m.hr.°C. or more.

6. The electrode substrate of claim 5, wherein the thickness of said first porous layer is in the range of about a fiftieth to a half of the total thickness of said porous carbonation layer.

7. The electrode substrate of claim 5, wherein said elongated holes for flowing coolant are parallel to each other, to an end face of the electrode, and to a side surface of the electrode, are continuously elongated in said separator from one side surface of the electrode to another side surface opposite thereto, and have the same cross-section area as a circle having a diameter of about 2 to 10 mm.

8. The electrode substrate of claim 5, wherein said elongated holes for feeding reactant gases are parallel to each other, to an end face of the electrode, and to a side surface of the electrode, are continuously elongated in said porous layer from one side surface of the electrode to another side surface opposite thereto, and have the same cross-sectional area as a circle having a diameter of about 0.5 to 3 mm; said elongated holes in said porous layer on one side of said separator and those in said porous layer on the other side of said separator being disposed perpendicular to each other.

9. An electrode substrate for fuel cells comprising (1) two porous carbonaceous layers, each having a number of elongated holes for feeding reactant gases into a fuel cell, which holes are defined near the center of the thickness thereof, and (2) a separator; said two porous layers and said separator being integrated as a whole body by calcination; each said porous layer being a uniform monolayer and having an average bulk density in the range of from about 0.4 to 0.8 g/cm$^3$, a porosity in the range of about 50 to 80%, a gas permeability of about 20 ml/cm.hr.mmAq. or more and a thermal conductivity of about 0.7 kcal/m.hr.°C. or more, about 60% or more of the open pores of said porous layer having a diameter of about 100 microns or less, said separator comprising a gas impermeable, carbonaceous separator plate and two pairs of gas impermeable, carbonaceous peripheral sealing members, a number of elongated holes for flowing coolant being provided near the center of the thickness of said separator plate, each pair of said members being on either side of said separator plate, the longitudinal direction of one pair of said members being perpendicular to that of the other pair of said members; said separator excluding said elongated holes having a gas permeability in the direction of the thickness of about $10^{-4}$ cm$^2$/hr.mmAq. or lower, bending strength of about 500 kg/cm$^2$ or higher, a thermal conductivity of about 4 kcal/m.hr.°C. or higher and an electric resistance of about 100 mΩ.cm or lower, said peripheral sealing member having a gas permeability in the direction towards a side surface of said separator of $10^{-2}$ cm$^2$/hr.mmAq. or less.

10. The electrode substrate of claim 9, wherein said peripheral sealing member has a height of about 2.5 mm or less.

11. The electrode substrate of claim 9, wherein said separator has been calcinated at about 100° C. or more.

12. The electrode substrate of claim 9, wherein said elongated holes for flowing coolant are parallel to each other to an end face of the electrode, and to a side surface of the electrode, are continuously elongated in said separator from one side surface of the electrode to another side surface opposite thereto. and have the same cross-sectional area as a circle having a diameter of about 2 to 10 mm.

13. The electrode substrate of claim 9, wherein said elongated holes for feeding reactant gases are parallel to each other, to an end face of the electrode, and to a side surface of the electrode, are continuously elongated in said porous layer from one side surface of the electrode to another side surface opposite thereto, and have the same cross-sectional area as a circle having a diameter of about 0.5 to 3 mm; said elongated holes in said porous layer on on one side of said separator and those in said porous layer on the other side of said separator being disposed perpendicular to each other.

* * * * *